July 13, 1965
R. R. McHENRY
3,194,336
VEHICLE REAR SUSPENSION
Filed Nov. 21, 1961
3 Sheets-Sheet 3
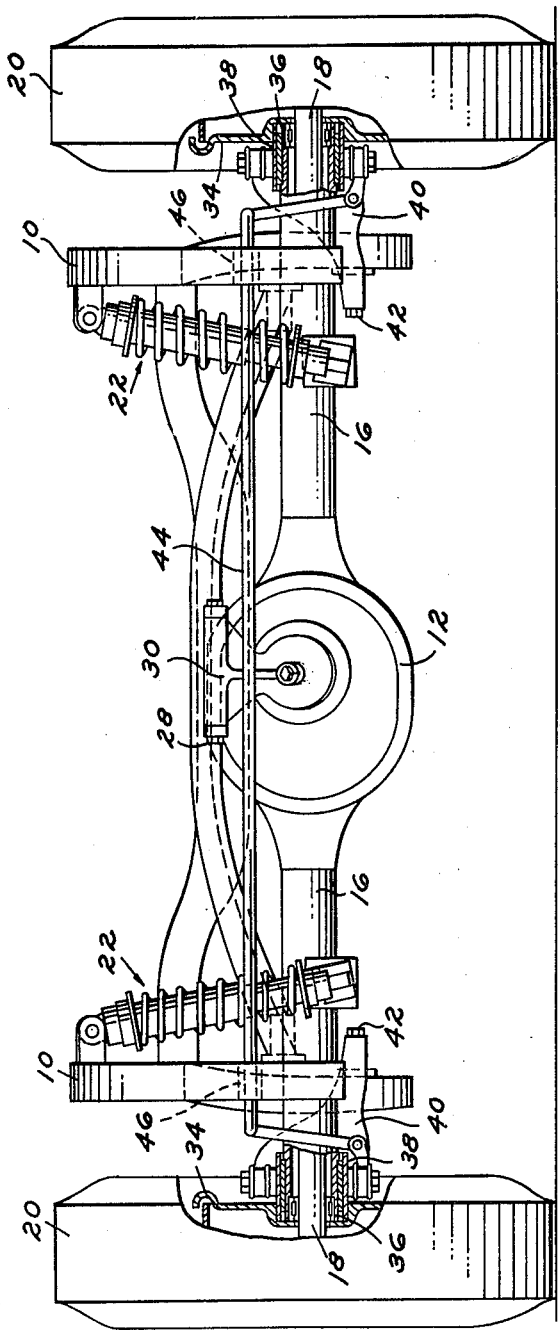
FIG. 3
RAYMOND R. McHENRY
INVENTOR.
BY John R. Faulkner
Clifford L. Hadley
ATTORNEYS

United States Patent Office 3,194,336
Patented July 13, 1965

3,194,336
VEHICLE REAR SUSPENSION
Raymond R. McHenry, Westport, Conn., assignor to Ford Motor Company, Dearborn, Mich., a corporation of Delaware
Filed Nov. 21, 1961, Ser. No. 153,887
10 Claims. (Cl. 180—73)

The present invention relates to vehicle suspension systems and more particularly to an improved rear suspension construction.

The current trend in automotive design is toward vehicle suspension systems employing spring means having a very low spring rate. While a soft spring tends to give a soft ride, certain problems are introduced, as an example, a change in vehicle loading will produce a greater deflection of the vehicle than is encountered with conventional suspension springs. This fact is appreciated when it is considered that a common vehicle spring rate at the wheel is approximately one hundred pounds per inch of deflection, while a vehicle with a low spring rate may have a rate of only 20 to 25 pounds per inch of deflection. Thus, it is readily seen that slight load changes in a vehicle having low rate springing will produce a significant deflection of the sprung mass of the vehicle.

In a low spring rate vehicle, static load changes are usually accommodated by mechanical leveling means that compensates for changes in static loading. A common expedient for achieving leveling is through employment of auxiliary springs.

Changes in dynamic loading will also introduce substantial suspension deflection. When a vehicle has a spring rate of from 20 to 25 pounds per inch it is imperative that the rear suspension geometry be constructed to counteract the dynamic load changes resulting from braking and acceleration. A suspension system which resists those forces is said to have anti-lift and anti-squat characteristics.

A desirable characteristic of a motor vehicle rear suspension is the ability of the suspension to counteract the tendency of the rear portion of the vehicle to squat during acceleration and to lift during braking. It is also desirable to introduce into the suspension a predetermined amount of roll understeer to afford proper control and precise handling characteristics during cornering. With the usual type of rear suspension, however, these characteristics are incompatible and cannot be simultaneously obtained in a single design. It is therefore an object of the present invention to provide a motor vehicle rear wheel suspension capable of achieving roll understeer and at the same time having anti-squat and anti-lift characteristics during acceleration and braking respectively.

During acceleration the transfer of vehicle weight rearwardly tends to cause the rearward portion of the vehicle to squat and the wheels to move in a jounce direction. Conversely, during a braking the transfer of weight forwardly causes the rearward portion of the vehicle to life and the wheels to move in a rebound direction. Means are known in the art to counteract these undesirable characteristics by appropriate suspension geometry. By providing a certain wheel path, anti-squat and anti-lift forces may at least partially counteract acceleration squat and brake lift.

Ordinarily one hundred percent anti-squat and one hundred percent anti-lift cannot be accomplished within a single suspension system since the compensating force vector available for brake lift is much smaller than the compensating force vector available for acceleration squat. In a conventional vehicle all of the acceleration forces are applied at the rear wheels only and can be utilized to counteract the effective rearward weight shift during acceleration. The braking forces, however, are distributed between both the front and rear wheels and only a portion, 40 to 45 percent for example, of the total braking effort is applied at the rear wheels. Consequently, a much smaller force is available to counteract the effective forward weight shift during braking.

In order to provide one hundred percent anti-squat and one hundred percent anti-lift forces the present invention provides separate torque reaction paths with the geometry associated with each path specifically arranged to give the desired characteristics. To accomplish these objectives, one embodiment of the present invention provides in a suspension system a pair of trailing lower suspension arms and a single A-frame shaped upper arm. To differentiate between braking and accelerating torque reactions, the brake backing plates are anchored to the trailing arms and have rotational freedom on the axle housing. Braking torque is thereby reacted by the trailing arms only, while accelerating torque is reacted by the A-frame and trailing arms together. This produces different paths for the side view ground contact point under the two conditions and the angular disposition of the trailing arms and A-frame can be readily adjusted to provide one hundred percent anti-features.

A further feature of an embodiment of the present invention includes the employment of a link between the A-frame and the differential carrier housing. The purpose of this link is to provide lateral support for the axle close to the axle center-line and thereby minimizing lateral axle oscillations. This construction also avoids excessive rear roll center height. By trailing arm and roll axis inclination, roll understeer can be maintained at approximately 6 minutes per degree of roll or other satisfactory level.

The foregoing objects and advantages of this invention will become amply apparent from the following description when taken with the accompanying drawings in which:

FIGURE 3 is a rear elevational view of the suspension of FIGURE 1.

Figure 1:
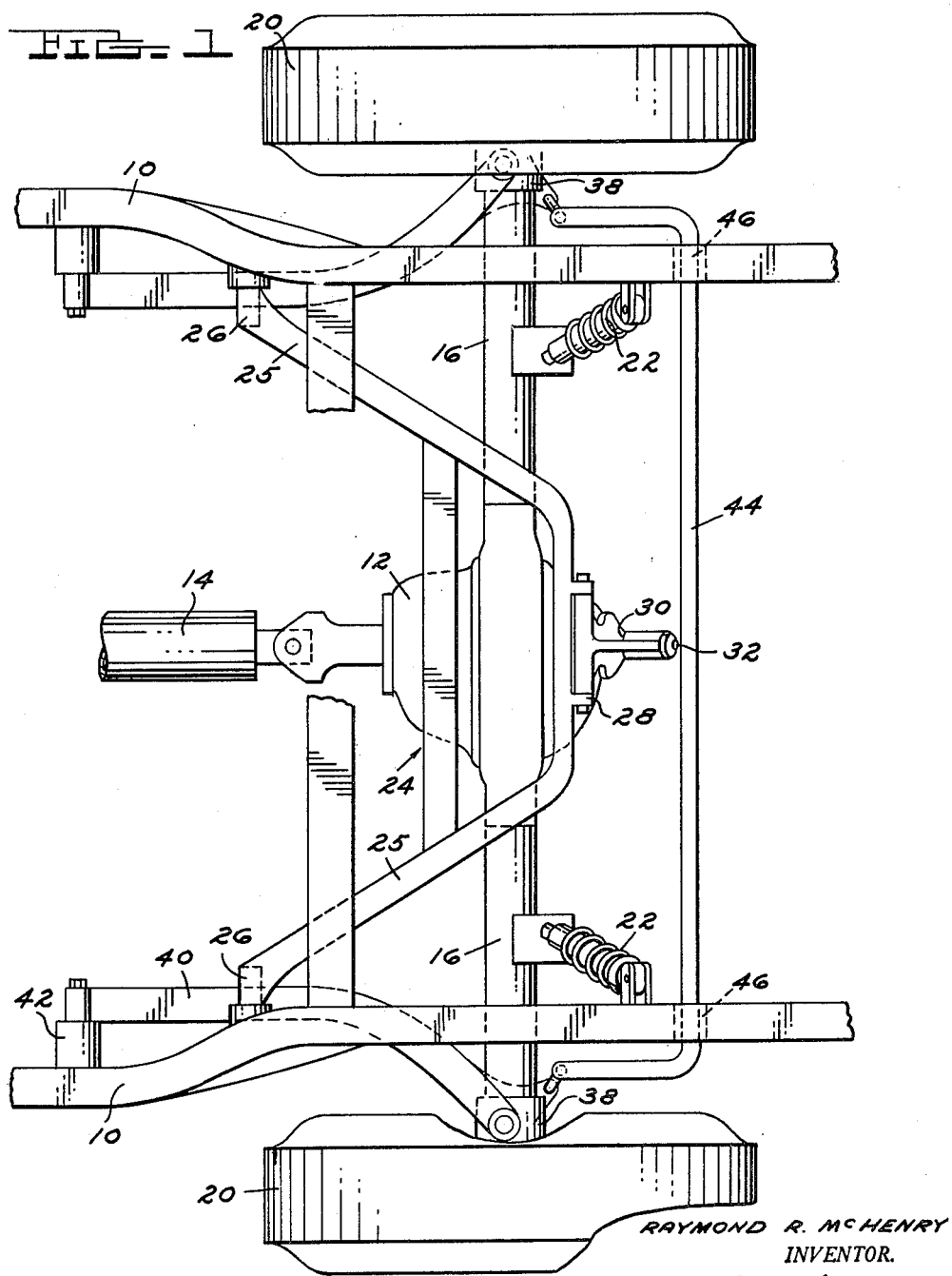
FIGURE 1 is a top plan view of a rear vehicle suspension system employing the present invention.

Referring now to the drawings wherein the presently preferred embodiment of this invention is disclosed, FIGURE 1 illustrates a rear wheel suspension system for a vehicle. Situated between the side rails 10 of a chassis frame is a differential housing 12 to which a drive shaft 14 is connected. The differential housing 12 is interposed in a transverse axle housing 16. Axle shafts 18 are journaled within the housing 16 and are drivingly connected to left and right road wheels 20. The differential gearing within the housing 12 receives driving torque from the drive shaft 14 and distributes it through the axle shafts 18 to the road wheels 20.

The chassis frame 10 is resiliently supported upon the axle housing 16 by a pair of left and right spring devices 22. These devices comprise telescopic shock absorbers having coil springs concentric about them for resilient support of the frame 10 and vehicle body.

Figure 2:
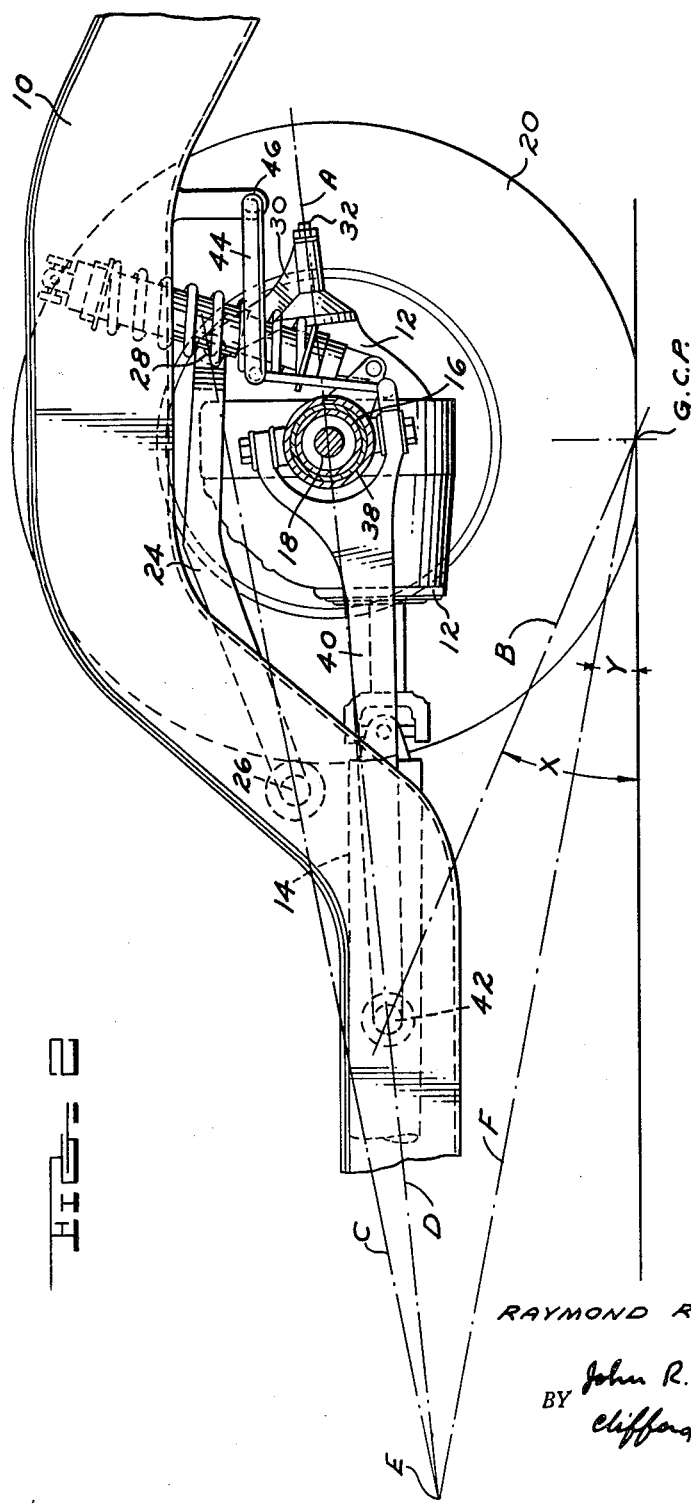
FIGURE 2 is a side elevational view of the suspension of FIGURE 1.

The differential housing 12 is connected to the frame 10 by means of an A-shaped upper suspension arm 24. Arm 24 has forwardly extending diverging legs 25 that are pivotally supported at 26 on frame mounted pivot brackets. The A-shaped arm 24 has a hinged type connection at 28 with an intermediate link 30. The link 30 is affixed to a pivot bolt 32 extending from the rear of the differential carrier 12. This latter connection provides a roll axis A that is inclined as indicated in FIGURE 2 for roll understeer. In one embodiment of the present invention the roll axis A was inclined to a horizontal longitudinal axis by approximately 6 degrees.

Brake backing plates 34 for the wheel assemblies 20 are connected to the outer ends of the axle housing 16 by means of a bearing construction. At each backing plate 34 a cylindrical bushing 36 surrounds the axle housing 16 and a second cylindrical piece 38 is concentric about the bushing 36. A pair of trailing type suspension arms 40 are pivotally connected at 42 at their forward ends to the chassis frame side rails 10 and extends rearwardly and outwardly therefrom. The rear ends of the trailing arms 40 are joined to the outer cylindrical member 38 surrounding the bushing 36. This construction provides a brake backing plate 34 that is rotationally fast relative to the trailing arm 40, however, both are free to rotate relative to the axle housing 16.

The trailing arms 40 are joined to the cylindrical piece 38 by a yoke type connection having a vertical pivot axis. This permits the articulation required by jounce and rebound wheel movement.

The suspension construction is completed by a stabilizer bar 44 that is journalled at 46 in brackets carried by the frame side rails 10. The bar 44 is connected at its ends to the outer ends of the axle housing 16 near each of the road wheels 20.

With the suspension construction described above, braking torque will be reacted solely through the trailing arms 40. The axle housings 16 are free to rotate relative to the arms 40 and therefore no braking torque can be transmitted from the backing plates 34 to the axle housing 16.

Referring now to side elevational view FIGURE 2, a line B passing through the pivot 42 of the trailing arm 40 and the ground contact point (GCP) for the tire 20 establishes an angle X with the horizontal. The product of the horizontal forces produced by braking and the tangent of the angle X is the resulting anti-lift force. The pivot 42 is so positioned to establish an angle X that will produce nearly 100 percent anti-lift characteristics, that is, the tangent of angle X times the braking force equals the effective weight shift occurring upon braking and counteracts or eliminates the weight shift to prevent a lifting of the rear end of the vehicle.

Because the braking reactions only occur through the trailing arm 40 due to the rotational mounting of the axle housing 16 relative to the backing plate 34, the foregoing geometry determines the effect of brake application.

The response of the suspension system to acceleration is determined by the geometry of both the upper A-frame 24 and the trailing arm 40. A line passing through the pivot centers 26 and 28 of the upper A-frame 24 is identified by the reference numeral C. A second line identified by the reference numeral D passes through the pivot center 42 and the center of the axle housing 16. These lines C and D intersect at a point E that is the instantaneous center of the arms 24 and 40. A line F is drawn to join the instantaneous center E of the linkage 40 and 24 with the ground contact point and establishes an angle Y with the horizontal. The tangent of the angle Y multiplied times the acceleration force determines the vertical vector or force component that is available to resist squatting upon acceleration. The angular relationship of the suspension linkage, trailing arms 40 and A-frame 24, changes as the suspension flexes, however, at design height they are arranged to intersect at a given instantaneous center E to establish an appropriate vertical force component to resist the reaction produced by acceleration weight shift and provide one hundred percent anti-squat characteristics.

It will be noted that the angle Y is substantially less than the angle X so that the tangent of angle Y is substantially less than the tangent of angle X. This relationship is provided because the braking forces at the rear wheels will be less than the acceleration forces. The braking forces are divided between both the front and rear so that only a portion occurs at the rear wheels whereas acceleration forces occur entirely at the rear driving wheels. Therefore, the greater force requires a smaller angle to produce an appropriate vertical component than does the lesser braking force require to produce its counteracting force component.

The foregoing description presents the presently preferred embodiment of this invention. Modifications and alterations may occur to those skilled in the art which will come within the scope and spirit of the following claims.

I claim:

1. A vehicle suspension system having sprung and unsprung components, suspension means interconnecting said components, said unsprung components including a pair of driving wheels and rigid axle housing means interconnecting said wheels, said suspension means including an arm pivotally connected to said sprung components at one end and rotatably connected to said axle housing means at its other end so as to have a transverse axis co-axial with said wheels, another arm pivotally interconnecting said sprung and said unsprung components, said arms having an instantaneous center located to provide anti-squat forces upon acceleration of said driving wheels.

2. A vehicle suspension system having sprung and unsprung components, suspension means interconnecting said components, said unsprung components including a pair of driving wheels and rigid axle housing means interconnecting said wheels, brake means contiguous to said driving wheels and rotatably mounted on said axle housing means, said suspension means including a pair of trailing arms pivotally connected to said sprung components at one of their ends and supportingly connected to a support element of said brake means at the other of their ends, an upper arm pivotally interconnecting said sprung and unsprung components, said arms having an instantaneous center located to provide anti-squat forces upon acceleration of said driving wheels.

3. A vehicle suspension system having sprung and unsprung components, suspension means interconnecting said components, said unsprung components including a pair of driving wheels and rigid axle housing means interconnecting said wheels, brake means contiguous to said driving wheels, said suspension means including an arm pivotally connected to said sprung components at one end and rotatably connected to said axle housing means at its other end, said other end being non-rotatably connected to said brake means, another arm pivotally connected at one of its ends to said sprung components, a link having a transverse pivotal connection to the other end of said second mentioned arm, the other end of said link being connected to said axle housing means by pivot means having a longitudinally inclined pivot axis, said arms having an instantaneous center located to provide anti-squat forces upon acceleration of said driving wheels.

4. A vehicle suspension system having sprung and unsprung components, suspension means interconnecting said components, said means including a plurality of suspension arms controlling the vertical path of said unsprung components relative to said sprung components, said unsprung components including a pair of driving wheels and rigid axle housing means interconnecting said wheels, one of said arms being connected to said sprung components about a generally transverse pivot axis and having its other end extending in a direction towards said axle housing means, a link interposed between said axle housing and said other end of said one arm, said link having a generally transverse pivot axis at its end connected with said one arm and a generally longitudinal pivot axis at its connection with said axle housing means.

5. The combination of claim 4 wherein said generally longitudinal pivot axis is inclined downwardly and forwardly.

6. The combination of claim 5 wherein said axle housing means includes a centrally located differential housing and said link is connected to said differential housing.

7. A vehicle suspension system having a frame, a wheel assembly, support means rotatably supporting said wheel assembly, brake structure connected to rotate with said wheel assembly, brake reaction means adapted to engage said brake structure, a first longitudinally extending suspension arm pivotally connected at one end to said frame and rigidly secured at its other end to a support element of said brake reaction means, second suspension arm means interconnecting said frame and said support means, said first arm and said second arm means being constructed for guiding said wheel assembly and support means along a vertical jounce and rebound path relative to said frame, and brake torque isolating means interposed between said brake reaction means and said support means constructed for preventing the transmission of braking forces from said brake reaction means to said support means and said second arm means.

8. A vehicle suspension system having a frame, a wheel assembly, support means rotatably supporting said wheel assembly, brake structure connected to rotate with said wheel assembly, brake reaction means adapted to engage said brake structure, suspension means interconnecting said frame and said support means and constructed for guiding said wheel assembly along a vertical jounce and rebound path relative to said frame, said suspension means including a suspension arm pivotally connected at one end to said frame and rigidly secured at its other end to a support element of said brake reaction means, and brake torque isolating means interposed between said brake reaction means and said support means constructed for preventing the transmission of braking forces from said brake reaction means to said support means.

9. A vehicle suspension system having sprung and unsprung components, suspension means interconnecting said components, said unsprung components including a pair of driving wheels and rigid axle housing means interconnecting said wheels, brake structure connected to rotate with said driving wheels, brake reaction means adapted to engage said brake structure and rotatably mounted on said axle housing means, said suspension means including an arm pivotally connected to said sprung components at one end and secured to a support element of said brake reaction means at its other end.

10. A vehicle suspension system having sprung and unsprung components, suspension means interconnecting said components, said unsprung components including a wheel and housing means rotatably supporting said wheel, said suspension means including an arm pivotally connected to said sprung components at one end and rotatably connected to said housing means at its other end so as to have a transverse axis coaxial with said wheel, another arm pivotally interconnecting said sprung and said unsprung components.

References Cited by the Examiner

UNITED STATES PATENTS

| | | | |
|---|---|---|---|
| 764,357 | 7/04 | Heaslet. | |
| 783,950 | 2/05 | Harrington | 180—72 |
| 820,179 | 5/06 | Byers | 267—66 |
| 1,213,031 | 1/17 | Smith | 267—66 |
| 1,232,781 | 7/17 | Ferguson | 180—72 |
| 1,759,370 | 5/30 | Rhodin. | |
| 2,300,844 | 11/42 | Olley | 180—73 |
| 2,367,817 | 1/45 | Brown | 180—73 |
| 2,369,501 | 2/45 | Wagner et al. | 180—73 |
| 2,988,160 | 6/61 | Hooven | 180—73 |
| 3,006,429 | 10/61 | Polhemus et al. | 180—73 |

A. HARRY LEVY, *Primary Examiner.*

PHILIP ARNOLD, ARTHUR L. LA POINT, *Examiners.*